United States Patent [19]

Burk et al.

[11] Patent Number: 4,472,790
[45] Date of Patent: Sep. 18, 1984

[54] STORAGE FETCH PROTECT OVERRIDE CONTROLS

[75] Inventors: John L. Burk, Poughkeepsie; Justin R. Butwell, Milton; Carl E. Clark, Poughkeepsie; John T. Rodell, Wappingers Falls; David E. Stucki, Poughkeepsie, all of N.Y.

[73] Assignee: International Business Machines Corporation, Armonk, N.Y.

[21] Appl. No.: 345,961

[22] Filed: Feb. 5, 1982

[51] Int. Cl.³ .................... G06F 9/00; G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,905,023 | 9/1975 | Perpiglia | 364/200 |
| 4,038,645 | 7/1977 | Birney et al. | 364/200 |
| 4,104,721 | 8/1978 | Markstein et al. | 364/200 |
| 4,135,240 | 1/1979 | Ritchie | 364/200 |
| 4,293,910 | 10/1981 | Flusche et al. | 364/200 |
| 4,355,355 | 10/1982 | Butwell et al. | 364/200 |
| 4,366,537 | 12/1982 | Heller et al. | 364/200 |
| 4,430,705 | 2/1984 | Cannavino et al. | 364/200 |

*Primary Examiner*—Raulfe B. Zache
*Assistant Examiner*—A. E. Williams, Jr.
*Attorney, Agent, or Firm*—Bernard M. Goldman

[57] ABSTRACT

The embodiment provides selective supervisory disablement of fetch protection for a special storage subarea (such as for the first half of the first 4KB block) while fetch protection is enabled for an area containing the subarea by a single storage protect key. That is, the fetch protect for the subarea (normally provided in the fetch protect for the entire area) by the area's protect key is overriden by the selective subarea disablement control, so that accesses to the subarea are not fetch protected by the storage key. The override protection control is secured by its enablement via a field position in a control register only accessible to supervisory programming. Thus, while fetch protection is set on for a predefined 4KB block, the fetch protect override controls can disable the fetch protection for a portion of the block's real addresses (e.g. addresses 0-2047).

7 Claims, 2 Drawing Figures

STORAGE FETCH PROTECT OVERRIDE CONTROLS

BACKGROUND OF THE INVENTION

This invention relates to the fetch protection of a critical area in the main storage (MS) of a data processing system. The critical area is smaller than, and contained within, the size of a main storage block protectable by a single storage protect key having a fetch protection field.

PRIOR ART

Fetch protection in this specification is used in the manner defined in the key in storage section of the prior IBM System/370 Principles of Operation (Form No. GA22-7000-8) which defines the System/370 architecture as providing one storage protect key for each 2 KB or 4 KB block in MS. Fetch protection for a storage request is defined as preventing any storage access by a CPU fetch request having a non-zero key access field in the CPU's current program status word (PSW) which mismatches the access field in an associated key (i.e. the key presently assigned to the block in main storage to which the request is being made). Key zero is an exception because key zero is reserved for use only by supervisory state programs. Therefore, any key zero request is permitted to access storage regardless of a mismatch of access fields and regardless of the state of the fetch protect bit in the storage key. Thus, for a key mismatch (except for key zero) to a fetch protected storage block: (1) when fetch protection is on, both fetch and store non-zero key requests are prohibited during a key mismatch, and (2) when fetch protection is off, only non-zero key mismatching store requests are prohibited but mismatching fetch requests are allowed. Hence, store protection is provided against mismatching non-zero key requests regardless of the state of the fetch protect bit. Some current System/370 control programs (e.g. MVS/SP) allocate and deallocate MS in units of 4 KB page frames. Under System/370 architecture, each CPU has its PSA page frame assigned to real addresses 0 through 4095 to contain critical hardware control related information. In a multiprocessor (MP), using for example MVS/SP, each CPU has its PSA page frame assigned to a different absolute address in shared MS by applying different prefixes to the real byte addresses 0–4095 for the respective CPUs.

System/370 CPUs have two 2 KB protection blocks for which both 2 KB storage protect keys are set to the same value for MVS for each 4 KB page frame in main storage. For the PSA page frame, the access fields are set to zero and fetch protect bit is set off in both keys for the two 2 KB blocks. Each other page frame has its two 2 KB keys set identically to each other, and they may be different for different page frames.

More recent System/370 CPUs can have 4 KB protection blocks, each with only one associated key. The PSA page frame has its associated key set with fetch protect disabled, preventing fetch protection for all of its 4 KB bytes in order to allow fetching of addresses 0–2047 KB by all users. Unfortunately, this prevents fetch protection for the other part of the 4 KB block at addresses 2048–4095.

Main store protection has been the subject of much consideration in the prior art, such as U.S. Pat. No. 3,576,544 (Cordero et al); 3,825,903 (W. W. Brown); 3,651,475 (Dunbar et al); and 4,093,987 (Gaudette et al), all assigned to the same assignee as the present application. None of these patents disclose the subject matter claimed in the subject specification.

SUMMARY OF INVENTION

Low storage protect in System/370 (disclosed and claimed in U.S. Pat. No. 4,093,987) protects against store requests using any key including zero. On the other hand, the subject invention does not protect against key zero but permits non-zero keys to access a subarea within an area normally protectable by an associated fetch protect bit.

This invention extends main storage protect key operations for System/370 extended architectures that use 4 KB protect keys for all of its 4 KB pages. This invention recognizes that system integrity is enhanced by providing different types of fetch protection within the PSA page which cannot be done with the associated 4 KB key.

To enable different fetch protections within a special 4 KB block, this invention provides fetch protect override controls to partly override the normal operation of the 4 KB storage key for a page located at a predetermined real address in MS. While 4 KB fetch protection is set on for the special page's 4 KB block, the fetch protect override controls disable fetch protection for a portion of the special page's real addresses (e.g. addresses 0–2047).

Override enablement is controlled by a fetch protect override control bit in a control register (e.g. bit 6 of control register 0).

These and other objects, features and advantages of the invention may be more fully understood and appreciated by considering the following detailed description in association with the accompanying drawings.

BRIEF DESCRIPTON OF THE DRAWINGS

DESCRIPTION OF THE DETAILED EMBODIMENT

Figure 1:
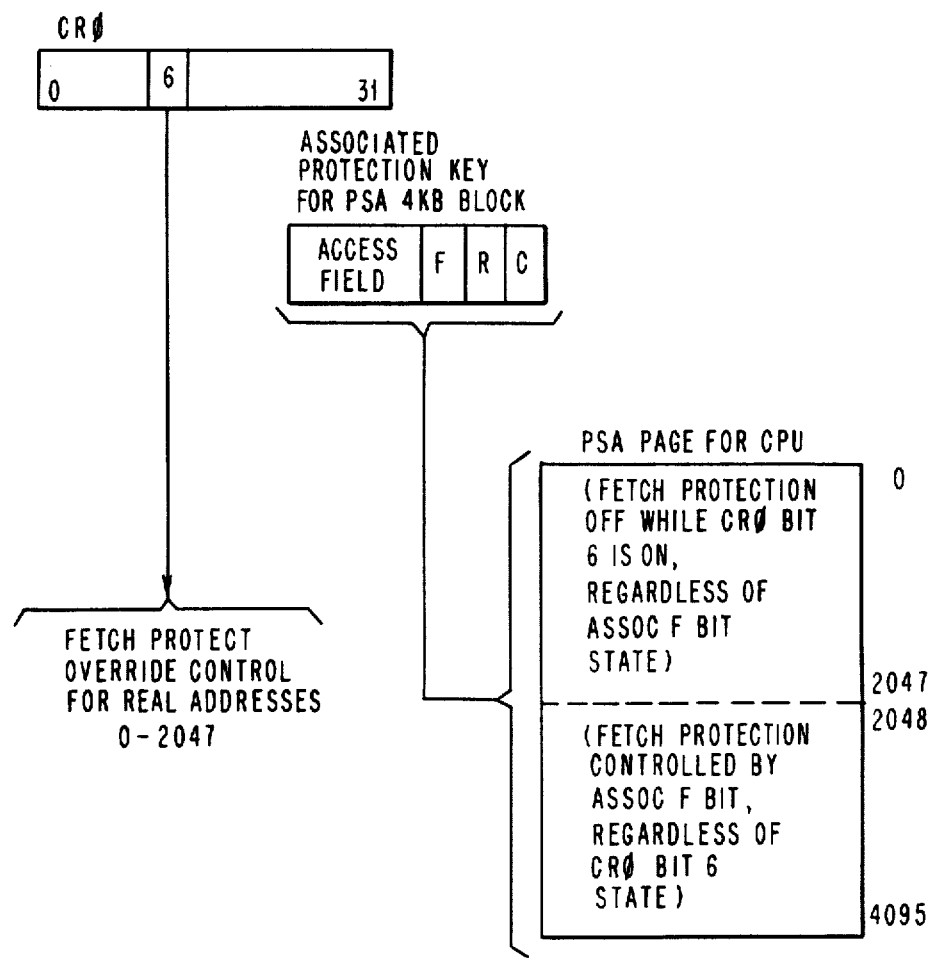
FIG. 1 illustrates the general operation of the invention.

FIG. 1 illustrates how control register CR0 bit 6 controls the override fetch protection for the preferred embodiment.

It is presumed that the storage key for the PSA block has its access field set to key zero (so that it can be stored into only by supervisor state programs).

The override controls in this embodiment apply to a special 4 KB page having a predetermined real address, called the PSA page, in order to obtain different types of fetch protection for different 2 KB parts of the PSA page. These two parts are predetermined to be located at main storage real addresses 0 through 2047 and 2048 through 4095 in a main storage page frame (i.e. PSA block) located by a prefix value assigned to the respective CPU.

The following TABLE summarizes how the CR0 bit 6 affects the storage operation for a CPU using 4 KB keys:

TABLE

| Fetch Prot. Override Cont. (CR0,6) | CPU Storage Operation |
| --- | --- |
| 0 | No override control (4KB PSA block fetch protected entirely controlled by the setting of |

TABLE-continued

| Fetch Prot. Override Cont. (CR0,6) | CPU Storage Operation |
|---|---|
| 1 | ASSOCIATED fetch protect bit). Override control. (PSA real addresses 2048-4095 have fetch protection controlled by the setting of associated fetch protect bit, while PSA real addresses 0-2047 have their fetch protection overriden.) |

If the state of CR0 bit 6 is zero, fetch protection for addresses 0-2047 is not overridden, so that all PSA addresses 0-4095 are fetch protected when the associated F bit state is one. Hence, any fetch request having a non-zero key will mismatch on its access field and either be allowed or be prohibited from accessing the PSA block at all of its real addresses 0-4095 according to the state of the F bit. Key zero request will be permitted to store or fetch into real addresses 0-4095 regardless of the state of the associated F bit and whether the access fields match.

If the state of CR0 bit 6 is one, then for all requests having a non-zero PSW protect key, control by the associated F bit is overridden for addresses 0-2047 to permit fetch accessing into addresses 0-2047 by any request whether or not it matches the PSA storage key. However, fetch accessing into addresses 2048-4095 remains controlled by the state of the F bit in the associated 4 KB protect key. In other words, when CR0 bit 6 is set on (e.g. set to one state), the real addresses 2048-4095 in the PSA of a CPU are fetch protected against accesses by non-matching non-zero key requests while the associated fetch protection bit F is on in the protection key for the PSA page, but addresses 0-2047 are not fetch protected against mismatching requests because their fetch protection from the associated F bit is overridden. Hence, while addresses 2048-4095 are fetch protected, any fetch or store request using a non-zero protect key (e.g. having any of keys 1-15 in the current PSW) cannot make any access to data at any of real addresses 2048-4095 in this main storage 4 KB block. Thus, during such override fetch protection, only fetch or store requests using key zero can access addresses 2048-4095, regardless of key mismatching of the access field. Since PSA addresses 0-2047 are not fetch protected by the on setting of the F bit in the associated protection key for the 4 KB PSA block, a fetch request by any key is permitted, regardless of key mismatching of its access field. But a non-zero key store request cannot access addresses 0-2047 because a key mismatch of the access field is obtained with the zero storage key. A key zero request can always store into addresses 0-2047 except where low address protection is active (as described in U.S. Pat. No. 4,093,987).

Figure 2:
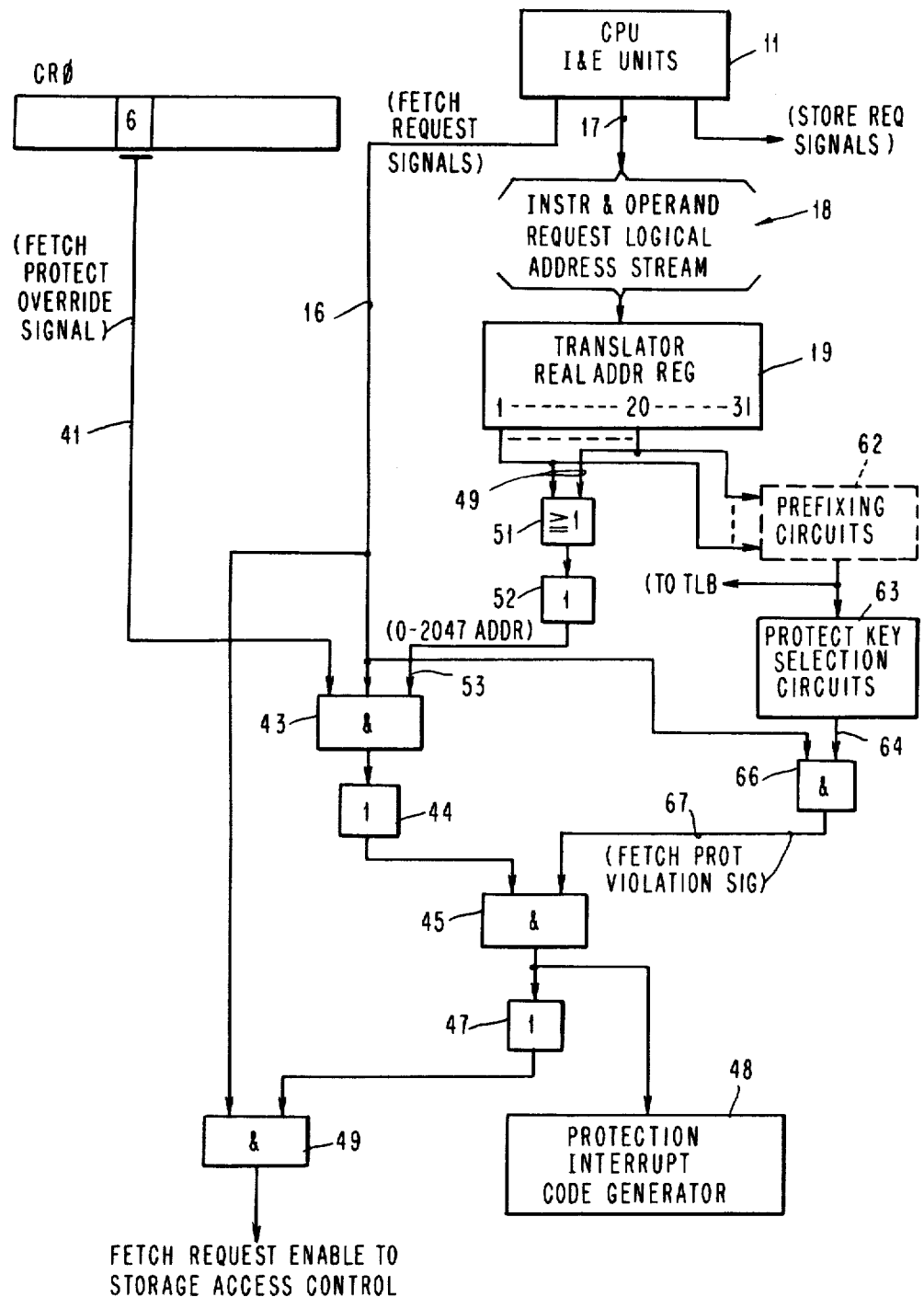
FIG. 2 shows a detailed embodiment of the invention.

FIG. 2 illustrates an embodiment of the 4 KB key override fetch protect controls for a special 4 KB PSA block having two 2 KB portions at real storage byte addresses 0 through 2047 and 2048 through 4095. It shows a CPU 11 having an instruction unit (I) and an execution unit (E), which execute instructions and generate storage request signals 17 which are represented by the instruction and operand logical address stream 18 for main storage. These logical addresses are provided to conventional address translation circuits of the type found in commercial System/370 CPUs which provide the corresponding real address into a 31 bit address word in a translator real address register 19 (that obtains the result of each address translation in the CPU using its logical addresses, or directly from the I or E unit when there is no dynamic address translation). In register 19, any bit positions in the address word having a higher order than the bit positions required to address the system main storage are set to zero state.

Lines 49 transmit high-order bit positions defining a 2 KB size block in main storage from the real address in register 19 (shown from bit position 1 through the 2 KB bit position 20 in relation to the 31 bit address word) to an OR circuit 51 having inverter 52 receiving the output of OR circuit 51. A storage request to the real byte address range 0-2047 within the PSA block is detected when all of lines 49 are in a zero state to cause inverter 52 to provide an output signal, which therefore only occurs for requests to the lower 2 KB addresses 0-2047 in the 4 KB PSA block.

Lines 49 also send the requested real address bits 1-20 to conventional prefixing circuits 62 to generate the absolute address of the different PSA blocks for the CPUs. Bit 20 is ignored in a CPU prefixing only in the 4K block size. The absolute address is sent to a translation lookaside buffer (TLB) and is used for locating the requested page frame in MS. The absolute address is provided for accessing the requested data in any cache and in main storage, and is also provided to conventional circuits 63 for accessing the associated storage protect key, comparing it to the current PSW key to determine a match or mismatch, and outputting the state of its fetch protect bit on a line 64.

The matching and mismatching protection operations for 4 KB keys are handled the same as such operations are handled for conventional System/370 CPUs, except for the override controls disclosed in detail herein.

An AND gate 66 receives the fetch protect bit line 64 and a fetch request line 16 from the CPU for providing a fetch protection violation signal on a line 67.

This embodiment uses bit position 6 in a control register (CR0) of the type found in the System/370 CPUs. CR0 bit 6 controls the enablement and disablement of the fetch protect override controls for the PSA 4 KB block by controlling the activation of an output line 41.

An AND gate 43 is enabled by an activating signal on line 41, a CPU fetch request signal on a line 16, and a signal on line 53 indicating that the request is being made to a real address within 0-2047.

Hence, an output signal from gate 43 is only provided when a fetch request is made to real addresses 0-2047 while the fetch protect override is active for address 0-2047. The output of gate 43 is inverted by an inverter 44 and is provided as input to an AND gate 45, which also receives any fetch protection violation signal from gate 66. An output from inverter 44 conditions AND gate 45 as long as there is no fetch request to addresses 0-2047 to be overridden. As a result, gate 45 will not output a fetch protect violation signal for a fetch request to addresses 0-2047 while the override control is enabled. But gate 45 will output a fetch protect violation signal for addresses 2048-4095 if the PSA fetch protect bit is on, and also gate 45 will output a fetch protect violation signal for a fetch request to any other MS block having its fetch protect bit enabled.

An inverter 47 receives the output from AND gate 45 and conditions an AND gate 49 as long as no fetch protect violation signal is provided from gate 45. Hence, gate 49 outputs a fetch request enable signal that enables the access of the fetch requested MS data. If gate 49 does not provide an output for a fetch request, the request is cancelled and no data access is performed for the request. Thus, even though a fetch request to the first 2048 bytes of the PSA page causes a fetch protection violation signal from gate 66, the request is not cancelled, since no output is then provided from AND gate 45 due to the fetch protection override state enabling gate 43 to decondition gate 45, causing gate 49 to be enabled by the fetch request signal on line 16 while the PSA fetch protect bit is enabled.

A fetch protect violation signal from gate 45 also activates a storage protection interrupt code generator 48 to interrupt the program making the request and insert an interrupt code into the switched PSW to identify any non-overridden fetch protection violation as the cause of the interrupt.

I/O channel main storage store and fetch protection are not affected by the fetch override control of this invention and operate in the conventional manner found in current IBM System/370 systems.

While the invention has been particularly shown and described with references to a preferred embodiment thereof, it will be understood by those skilled in the art that the foregoing and other changes in form and details may be made therein without departing from the spirit and scope of the invention.

Having thus described out invention, what we claim as new and desire to secure by Letters Patent is:

1. Fetch protection controls in a processor of a data processing system having a main storage comprised of a plurality of addressable main storage blocks, one storage protect key respectively associated with each block, each of the keys having a fetch protect field for controlling the fetch protection for an associated block, the fetch protection controls comprising:
    means for controlling each assess for data by a fetch request to any block in main storage by the state of the fetch protect field with the storage protect key associated with the respective block,
    control register (CR) means having a fetch protect override field settable to a fetch override state to provide an override signal for disabling fetch protection for a predetermined range of real addresses in a predtermined block while fetch protection is set on in the fetch protect field for the predetermined block,
    override control means for controlling accesses of data in storage by a fetch request to the predetermined range during the existence of the override signal, the predetermined range having its fetch protect overrideability controlled by the state of the override field, while the other blocks in main storage are not affected by the override signal so that their fetch protectablility is entirely controlled by the state of their respective fetch protect fields in their associated storage protect keys.

2. Fetch protection controls as defined in claim 1, further comprising:
    the predetermined block being assigned to a page frame in main storage having CPU related information.

3. Fetch protection controls as defined in claim 2, further comprising:
    the predetermined range in the predetermined block being equal to the remainder of the predetermined block.

4. Fetch protection controls as defined in claim 2, further comprising:
    the predetermined block having two equal ranges located at byte real addresses 0 through 2047 and 2048 through 4095, in which addresses 0 through 2047 comprise the predetermined range which is fetch protect overrideable.

5. Fetch protection controls as defined in claim 2, further comprising:
    means for sensing each fetch request to the predetermined range in main storage during the existence of the override signal,
    means for generating a fetch protection violation signal whenever any fetch request is to a block having its associated fetch protect field set to a fetch protect state,
    means for inhibiting the generating means from providing the fetch protect violation signal when the sensing means senses a fetch request in the predetermined range,
    means for enabling a fetch request for main storage when the inhibit means is inhibiting any fetch protect violation signal.

6. Fetch protection controls as defined in claim 5, the violation signal means further comprising:
    means for providing an inverted output of the sensing means for indicating the fetch request is not in the predetermined range,
    means for activating the generating means to output a fetch protect violation signal when an inverted output is provided by from the providing means,
    fetch protection interrupt means being enabled to receive the fetch protect violation signal while the inverted output is being provided by the providing means for a fetch request in the predetermined range.

7. Fetch protection controls as defined in claim 6, further comprising:
    fetch request control means for enabling each fetch request to access any requested block not having its associated fetch protect field being set on or to access the predetermined range when the override signal is being provided by the control register means while the predetermined block is being fetch protected by its associated fetch protect field being set on.

* * * * *